US012572492B1

(12) United States Patent
Montero et al.

(10) Patent No.: US 12,572,492 B1
(45) Date of Patent: Mar. 10, 2026

(54) BRIDGING AGENT FOR AN EMBEDDED CONTROLLER IN AN ADVANCED REDUCED INSTRUCTION SET COMPUTER MACHINES (ARM) BASED ARCHITECTURE SYSTEM

(71) Applicant: Dell Products L.P., Round Rock, TX (US)

(72) Inventors: Adolfo Sandor Montero, Pflugerville, TX (US); Suraj M. Varma, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/820,564

(22) Filed: Aug. 30, 2024

(51) Int. Cl.
*G06F 13/40* (2006.01)
*G06F 1/26* (2006.01)

(52) U.S. Cl.
CPC .......... *G06F 13/4027* (2013.01); *G06F 1/266* (2013.01); *G06F 2213/0016* (2013.01)

(58) Field of Classification Search
CPC ................ G06F 13/4027; G06F 1/266; G60F 2213/0016
See application file for complete search history.

(56) References Cited

U.S. PATENT DOCUMENTS

| | | | | |
|---|---|---|---|---|
| 11,012,072 | B1 * | 5/2021 | Jennings | .......... H03K 19/00369 |
| 2001/0003206 | A1 * | 6/2001 | Pole, II | ................. G06F 1/3296 |
| | | | | 713/320 |
| 2013/0111229 | A1 * | 5/2013 | Borland | ............. G06F 15/7803 |
| | | | | 713/300 |
| 2018/0373607 | A1 * | 12/2018 | Kuehnis | ............. G06F 11/2733 |
| 2019/0129880 | A1 * | 5/2019 | Zhu | .................... G06F 13/4282 |
| 2023/0093142 | A1 * | 3/2023 | Guo | ..................... H01M 10/48 |
| | | | | 703/18 |
| 2023/0176873 | A1 * | 6/2023 | Wu | ........................... G06F 1/00 |
| | | | | 713/1 |
| 2023/0281080 | A1 * | 9/2023 | Wu | .................... G06F 11/1415 |
| | | | | 714/43 |
| 2024/0134819 | A1 * | 4/2024 | Montero | ............ G06F 15/7807 |
| 2024/0192757 | A1 * | 6/2024 | Varma | ..................... G06F 1/206 |
| 2024/0370078 | A1 * | 11/2024 | Meza Arellamo | .... G06F 1/3296 |
| 2025/0045142 | A1 * | 2/2025 | Montero | ............. G06F 21/554 |

* cited by examiner

*Primary Examiner* — Henry Tsai
*Assistant Examiner* — Aurangzeb Hassan
(74) *Attorney, Agent, or Firm* — WOMBLE BOND DICKINSON (US) LLP

(57) ABSTRACT
Methods and systems for managing cooling of a data processing system. In particular, methods and system for providing system temperature control using an embedded controller installed in a data processing system having an advanced reduced instruction set computer machines (ARM) based architecture system on a chip (SoC) are provided. The embedded controller may be bridged to the ARM based architecture SoC using a bridging agent that bridges enhanced serial peripheral interface (eSPI) format communication to system power management interface (SPMI) format communication.

20 Claims, 6 Drawing Sheets

BRIDGING AGENT FOR AN EMBEDDED CONTROLLER IN AN ADVANCED REDUCED INSTRUCTION SET COMPUTER MACHINES (ARM) BASED ARCHITECTURE SYSTEM

FIELD

Embodiments disclosed herein relate generally to managing data processing systems. More particularly, embodiments disclosed herein relate to systems and methods for managing cooling of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
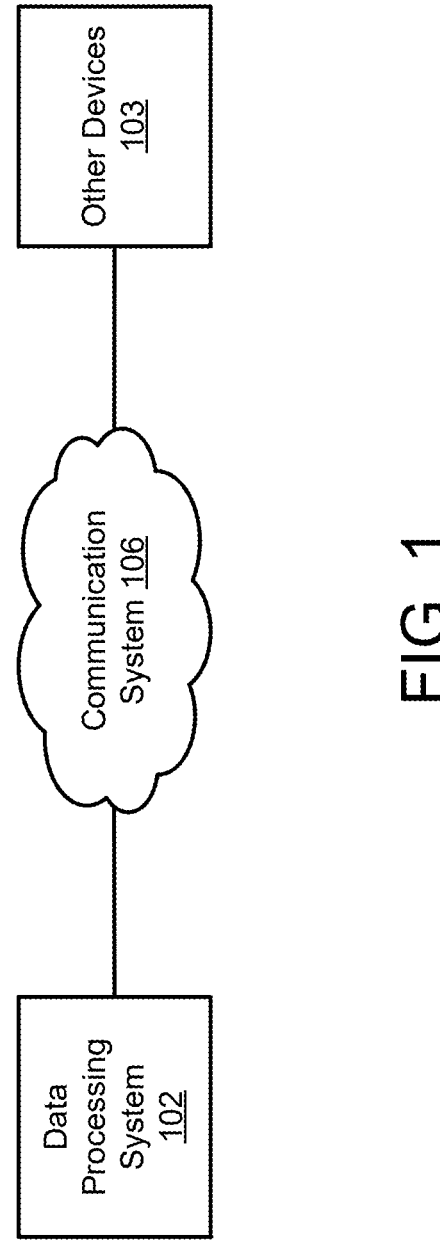
FIG. 1 shows a block diagram illustrating a distributed system in accordance with one or more embodiments.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing cooling of a data processing system. For example, data processing system may be cooled passively using passive cooling techniques (e.g., through throttling of the central processing unit (CPU), application management, or the like where a physical fan is not involved in the cooling process) (also referred to herein as "passive cooling") or may be cooled actively using active cooling techniques (e.g., using one or more physical fans installed within the data processing system) (also referred to herein as "active cooling").

System on a chip (SoC) devices (e.g., portable computing devices such as smartphones, tablet computers, or the like) utilize an advanced reduced instruction set computer machines (ARM) based architecture that is only capable of providing passive cooling through throttling of a processor installed on an SoC integrated circuit (SoC IC) (also referred to herein as just "SoC") installed within these SoC devices. The SoC IC may be, for example, the main processing chip designed to be installed in a portable computing device (e.g., smartphones, tablets, or the like) having housings with limited internal space/capacity that generally do not allow for installation of a motorized fan for blowing warm and/or hot air out of the housing. Examples of such SoCs may include, but are not limited to: the Apple™ A series chips, the Qualcomm Snapdragon® series chips, or the like.

Furthermore, in such ARM based architecture SoC devices, the thermal sensors (e.g., thermistors, skin temperature sensors, or the like) that measure the temperature within these devices directly communicate thermal measurements to the SoC. In particular, the SoC includes power management integrated circuits (PMICs) (also referred to herein as a "power management circuit") to which these thermal sensors report the thermal measurements. However, because multiple PMICs are generally involved in the obtaining of such thermal measurements, such ARM based architecture SoC devices lack a single interface (e.g., an application programming interface (API) or the like) that can be called on (e.g., by one or more higher level stacks such as a stack of the main processor of the devices) to retrieve all of the thermal measurements at one time.

Even with such limitations, the SoCs (namely, ARM based architecture SoCs) of such ARM based architecture SoC devices are (e.g., computational-wise) very powerful and highly sought out to be used in other devices and/or systems. For example, users may wish to combine these SoCs (originally designed for SoC devices) with components from other computing architectures types (e.g., an x86 architecture, or the like) to leverage advantages and benefits of these other computing architectures types that ARM based architectures lack. However, because these ARM based architecture SoCs are not originally designed to interact (e.g., be compatible) with components of such other computing architecture types, there are many challenges associated with combining components from other computing architecture types with these ARM based architecture SoCs.

To overcome these challenges and limitations of ARM based architecture SoCs, the inventors have provided, as part of one or more embodiments disclosed herein, mechanisms and components that bridge components from these other computing architecture types with ARM based architecture SoCs without having to change up a hardware configuration of such ARM based architecture SoCs (i.e., these ARM based architecture SoCs can be used as is without any costly physical design changes). Such bridging also advantageously creates a single interface (e.g., an application programming interface (API) or the like) that can be called upon (e.g., by higher level stacks such as processing stacks of the ARM based architecture SoCs) to retrieve all thermal measurements of the data processing system. These mechanisms and components of one or more embodiments are discussed in more detail below in reference to FIGS. 2B and 3.

As a result, embodiments disclosed herein directly improves thermal management technology in data processing systems (e.g., computing devices) having ARM based architecture SoCs. In particular, use of such single interface (that can be called on by the higher level stacks) not only improves software transparency but also provides a cleaner architecture for managing thermal data (e.g., the thermal measurements by the thermal sensors). Additionally, software transparency and cleaner architecture also results in more efficient use of computing resources of a data processing system, which not only improves the general operations of such a data processing system but also improves the functionalities (e.g., enabling better cooling of the system through faster and more reliable and less resource intensive retrieval of thermal data, or the like) of such a data processing system.

In an embodiment, a computer-implemented method for providing system temperature control using an embedded controller installed in a data processing system having an advanced reduced instruction set computer machines (ARM) based architecture system on a chip (SoC) is provided. The method may include: obtaining, by the embedded controller of the data processing system instead of the ARM based architecture SoC, temperature data of the data processing system; providing, by the embedded controller and via a first bridge interface, the temperature data to a bridging agent of the data processing system; providing, by the bridging agent and via a second bridge interface, the temperature data to the ARM based architecture SoC; and performing, by the ARM based architecture SoC and using the temperature data, one or more temperature control actions to realize the system temperature control for the data processing system.

The embedded controller obtains the temperature data directly from one or more thermal sensors of the data processing system via an inter-integrated circuit (I2C)/improved inter-integrated circuit (I3C) interface between each of the one or more thermal sensors and the embedded controller.

The one or more thermal sensors directly transmit the temperature data to the embedded controller instead of to power management circuits of the ARM based architecture SoC, and the power management circuits of the ARM based architecture SoC being no longer able to receive the temperature data directly from the one or more thermal sensors.

The bridging agent comprises the first bridge interface and the second bridge interface, and the first bridge interface translates the temperature data between a native format used by the embedded controller and an enhanced serial peripheral interface (eSPI) format, the temperature data being provided by the embedded controller to the bridging agent in the eSPI format.

The second bridge interface translates the temperature data between the eSPI format to a system power management interface (SPMI) format, the temperature data being provided by the bridging agent to the ARM based architecture SoC in the SPMI format.

The embedded controller is unable to provide the temperature data directly to the ARM based architecture SoC without the bridging agent, and the ARM based architecture SoC comprises an SPMI interface that receive the temperature data from the bridging agent in the SPMI format.

The embedded controller is unable to provide the temperature data directly to the ARM based architecture SoC without the bridging agent, and the ARM based architecture SoC comprises an SPMI interface that receive the temperature data from the bridging agent in the SPMI format.

The ARM based architecture SoC is directly adapted from a device that is designed to implement the temperature control without the embedded controller and with only the ARM based architecture SoC.

The embedded controller is configured to take over control of one or more thermal sensors of the data processing system originally controlled by the ARM based architecture SoC, the one or more thermal sensors are configured to collect the temperature data.

The method may further include: determining that the ARM based architecture SoC is attempting to retrieve the temperature data using a temperature fetching call, the temperature fetching call being intended for one or more thermal sensors of the data processing system; re-routing, instead of sending the temperature fetching call directly from the ARM based architecture SoC to the one or more thermal sensors, the temperature fetching call from the ARM based architecture SoC to the embedded controller, the temperature fetching call being re-routed via the bridging agent; providing, by the embedded controller and using the bridging agent, the temperature data to the ARM based architecture SoC to complete the temperature fetching call.

The temperature fetching call is an SPMI hardware access call made by the ARM based architecture SoC to pull the temperature data from the one or more thermal sensors, and re-routing the temperature fetching call comprises formatting, by the bridging agent, the SPMI hardware access call into an eSPI format temperature data fetching call to be transmitted to the embedded controller over the first bridge interface.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1, a block diagram illustrating a distributed system in accordance with an embodiment is shown. The (distributed) system shown in FIG. 1 may provide computer-implemented services. The computer-implemented services may include any type and quantity of services including, for example data services (e.g., data storage, access and/or control services), communication services (e.g., instant messaging services, video-conferencing services), and/or any other type of service that may be implemented with a computing device.

The computer-implemented services may be provided by one or more components of the system of FIG. 1. For example, data processing system 102 may be implemented as any type of computing device (e.g., desktop computers, mobile phones, tablets, laptops, or the like) that may provide computer-implemented services. For example, the computer-implemented services may include data storage services, instant messaging services, database services, and/or any other type of service that may be implemented with a computing device.

Such computer-implemented services may be provided to one or more users of the data processing system 102 and/or to users of other devices 103 (e.g., via the users of other devices 103 requesting such computer-implemented services from the data processing system 102). Conversely, the other devices 103 may also provide computer-implemented services to the data processing system 102. In embodiments, any of the data processing system 102 and the other devices 103 may implemented as a computing device (e.g., computing device of FIG. 5)

To provide the computer-implemented services, the system of FIG. 1 may include any number of the data processing system 102 and the other devices 103. Data processing system 102 and the other devices 103 may provide the computer-implemented services to their respective users and/or to other devices (not shown). Data processing system 102 and the other devices 103 may provide similar and/or different computer-implemented services. Data processing system 102 and the other devices 103 may also be organized in one or more deployments (e.g., server farms, remote storage environments, Cloud-RAN deployments, or the like) to collectively provide the computer-implemented services.

To provide the computer-implemented services, data processing systems 102A-102N may include various hardware components (e.g., processors, memory modules, storage devices, peripheral devices, etc.) and host various software components (e.g., operating systems, application, startup managers such as basic input-output systems, etc.). These hardware and software components (discussed in more detail below in FIG. 2A) may provide the computer-implemented services via their operation.

The software components may be implemented using various types of services. For example, each data processing system of the data processing systems 102A-102N may host various services that provide the computer-implemented service (e.g., application services) and/or that manage the operation of these services (e.g., management services). The aggregate (e.g., combination) of the management and application services may be a complete service that provide desired functionalities.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
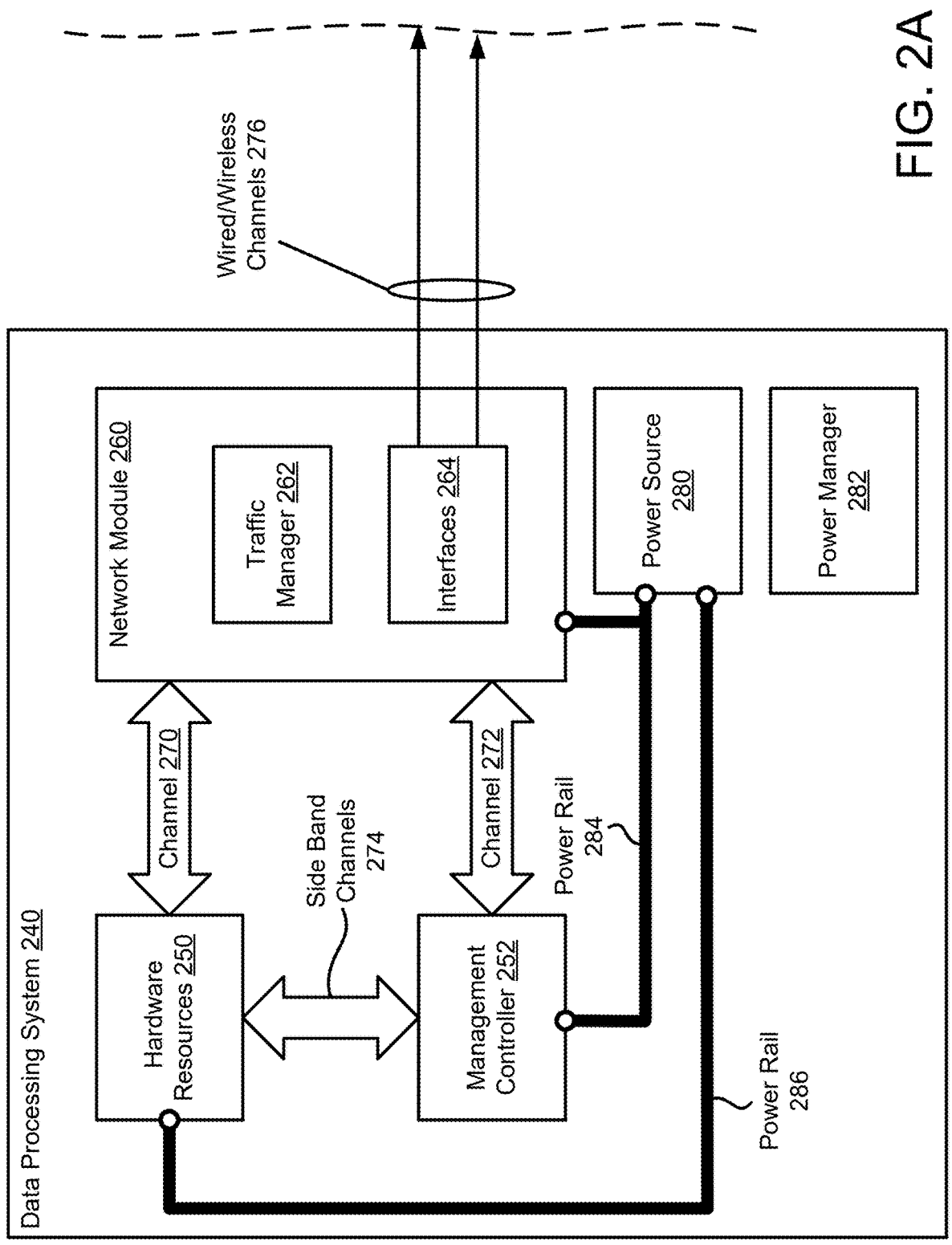
FIG. 2A shows a block diagram illustrating an example data processing system in accordance with one or more embodiments.

Turning to FIG. 2A, a diagram illustrating an example data processing system 240 in accordance with an embodiment is shown. The data processing system 240 shown in FIG. 2A may be similar to data processing system 102 (and/or any of the other devices 103) shown in FIG. 1.

To provide computer-implemented services, data processing system 240 may include any quantity of hardware resources 250. Hardware resources 250 may be in-band hardware components, and may include a processor (e.g., a central processing unit (CPU) as part of a main processing unit of the data processing system 240 that contains the CPU and any number of graphical processing units (GPUs) or the like) operably coupled to memory, storage, and/or other hardware components (e.g., thermistors, on-board thermistors, other types of sensors, fans, or the like). In some embodiments, all or a portion of the hardware resources 250 may make up and be packaged within a single SoC IC (e.g., an SoC IC adapted from an SoC device). For example, the SoC IC may be implemented in the form of a single chip containing all or a portion of the hardware resources 250. The single chip making up the SoC IC may have input and output ports that connect the hardware resources 250 making up the SoC IC to other components (e.g., other hardware and/or software components) of the data processing system 240. In embodiments, the SoC IC may be an advanced reduced instruction set computer machines (ARM) based architecture based SoC.

In embodiments, the processor (e.g., CPU) of the SoC IC may be a main processor of the data processing system 240. This main processor may host various management entities such as operating systems (OS), drivers (e.g., OS-based and non-OS based drivers), OS stacks, firmware stacks, network stacks, and/or other software entities that provide various management functionalities. For example, the OS and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 250 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 270 to a communication component, which may then send the packaged communication (in a yet further packaged form, in some embodiments, with various layers of encapsulation being added depending on the network environment outside of data processing system 240) to another device via any number of intermediate networks (e.g., via wired/wireless channels 276 that are part of the networks).

To reduce the likelihood of the applications and/or other in-band entities from being indirectly compromised, data processing system 240 may include management controller 252 and network module 260. Each of these components of data processing system 240 is discussed below.

Management controller 252 may be implemented, for example, using a system on a chip or other type of independently operating computing device (e.g., a microcontroller or the like that is independent from the in-band components, such as hardware resources 250 of a host data processing system 240). Management controller 252 may provide various management functionalities for data processing system 240. For example, management controller 252 may monitor various ongoing processes performed by the in-band components, may manage power distribution, thermal management, and/or may perform other functions for managing data processing system 240. In some embodiments, the management controller 252 may act as the embedded controller of the data processing system 240. In some embodiments, the management controller 252 may be the sole embedded controller of the data processing system 240 (e.g., there is no separate embedded controller as part of the hardware resources 250).

In embodiments, the management controller 252 may be implemented as an embedded controller (e.g., 290 of FIG. 2B) with separate memory (e.g., random access memory (RAM)) from that of the main processor (installed in the ARM based architecture SoC). The embedded controller may also operate independently from the main processor (e.g., using its own secondary and independent processor) and perform independent functions such as, but not limited to: (i) receiving and processing signals from a keyboard or other input devices of the data processing system 240; (ii) retrieving thermal measurements (e.g., thermal information) from various components of the data processing system (e.g., from the SoC), from one or more thermal sensors installed within the data processing system 240, or the like); (iii) using the thermal measurements to control one or more fans installed within the data processing system 240 and/or to throttle the main processor of the SoC; or the like.

In embodiments, the management controller 252 (acting as an embedded controller) may be configured to have control over all thermal readings (e.g., temperature measurements) of the thermal sensors installed in the data processing system 240. This advantageously creates (through the embedded controller) a single interface (e.g., a single API or the like) that can be called on (e.g., by the stacks of the main processor) when thermal readings are needed for thermal management of the data processing system 240. Use of the management controller as the single interface for thermal readings advantageously provides improved software transparency and a cleaner architecture for the data processing system 240. Additional details of how the management controller 252/embedded controller will be used as the single interface will be described below in reference to FIG. 2B.

In embodiments, to provide its functionalities, management controller 252 may be operably connected to various components via sideband channels 274 (in FIG. 2A, a limited number of sideband channels are included for illustrative purposes, it will be appreciated that management controller 252 may communicate with other components via any number of sideband channels). The sideband channels may be implemented using separate physical channels, and/or with a logical channel overlay over existing physical channels (e.g., logical division of in-band channels). The sideband channels may allow management controller 252 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities. For example, the management controller may use sideband channels (e.g., inter-integrated circuit (I2C)/improved inter-integrated circuit (I3C) interfaces/channels, analog-to-digital converter (ADC) channels, or the like).

For example, to reduce the likelihood of indirect compromise of an application hosted by hardware resources 250, management controller 252 may enable information from other devices to be provided to the application without traversing the network stack and/or management entities of hardware resources 250. To do so, the other devices may direct communications including the information to management controller 252.

Management controller 252 may then, for example, send the information via sideband channels 274 to hardware resources 250 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 252 may be operably connected to communication components of data processing system 240 via separate channels (e.g., 272) from the in-band components, and may implement or otherwise utilize a distinct and independent network stack (e.g., TCP/IP). Consequently, management controller 252 may communicate with other devices independently of any of the in-band components (e.g., does not rely on any hosted software, hardware components, etc.). Accordingly, compromise of any of hardware resources 250 and hosted components may not result in indirect compromise of any management controller 252, and entities hosted by management controller 252.

To facilitate communication with other devices, data processing system 240 may include network module 260. Network module 260 may provide communication services for in-band components and out-of-band components (e.g., management controller 252) of data processing system. To do so, network module 260 may include traffic manager 262 and interfaces 264.

Traffic manager 262 may include functionality to (i) discriminate traffic directed to various network endpoints advertised by data processing system 240, and (ii) forward the traffic to/from the entities associated with the different network endpoints. For example, to facilitate communications with other devices, network module 260 may advertise different network endpoints (e.g., different media access control address/internet protocol addresses) for the in-band components and out-of-band components. Thus, other entities may address communications to these different network endpoints. When such communications are received by network module 260, traffic manager 262 may discriminate and direct the communications accordingly (e.g., over channel 270 or channel 272, in the example shown in FIG. 2A, it will be appreciated that network module 260 may discriminate traffic directed to any number of data units and direct it accordingly over any number of channels).

Accordingly, traffic directed to management controller 252 may never flow through any of the in-band components. Likewise, outbound traffic from the out-of-band component may never flow through the in-band components.

Thus, if in-band components of data processing system 240 are unsecured and/or compromised (e.g., by a malicious party), then the computing instructions sent using out-ofband components and via out-of-band communication channels may be less likely to be intercepted and/or modified (e.g., by the malicious party), and the operation of data processing system 240 may be more likely to be updated according to its reported location.

To support inbound and outbound traffic, network module 260 may include any number of interfaces 264. Interfaces 264 may be implemented using any number and type of communication devices which may each provide wired and/or wireless communication functionality. For example, interfaces 264 may include a wireless wide area network (WWAN) card, a Wi-Fi card, a wireless local area network card, a wired local area network card, an optical communication card, and/or other types of communication components. These components may support any number of wired/wireless channels 276.

Thus, from the perspective of an external device, the in-band components and out-of-band components of data processing system 240 may appear to be two independent network entities, that may be independently addressable and/or otherwise unrelated to one another.

To facilitate management of data processing system 240 over time, hardware resources 250, management controller 252 and/or network module 260 may be positioned in separately controllable power domains. By being positioned in these separate power domains, different subsets of these components may remain powered while other subsets are unpowered.

For example, management controller 252 and network module 260 may remain powered while hardware resources 250 is unpowered. Consequently, management controller 252 may remain able to communicate with other devices even while hardware resources 250 are inactive. Similarly, management controller 252 may perform various actions while hardware resources 250 are not powered and/or are otherwise inoperable, unable to cooperatively perform various process, are compromised, and/or are unavailable for other reasons. Therefore, if hardware resources 250 become unavailable (e.g., due to being unpowered), then out-of-band components may remain powered, allowing network module 260 to continue to generate location data for data processing system 240.

To implement the separate power domains, data processing system 240 may include a power source (e.g., 280) that separately supplies power to power rails (e.g., power rail 284, power rail 286) that power the respective power domains. Power from the power source (e.g., a power supply, battery, etc.) may be selectively provided to the separate power rails to selectively power the different power domains. A power manager (e.g., 282) that may manage power from power source 280 may be supplied to the power rails. Management controller 252 may cooperate with power manager 282 to manage supply of power to these power domains.

In FIG. 2A, an example implementation of separate power domains using power rails 284-286 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2B:
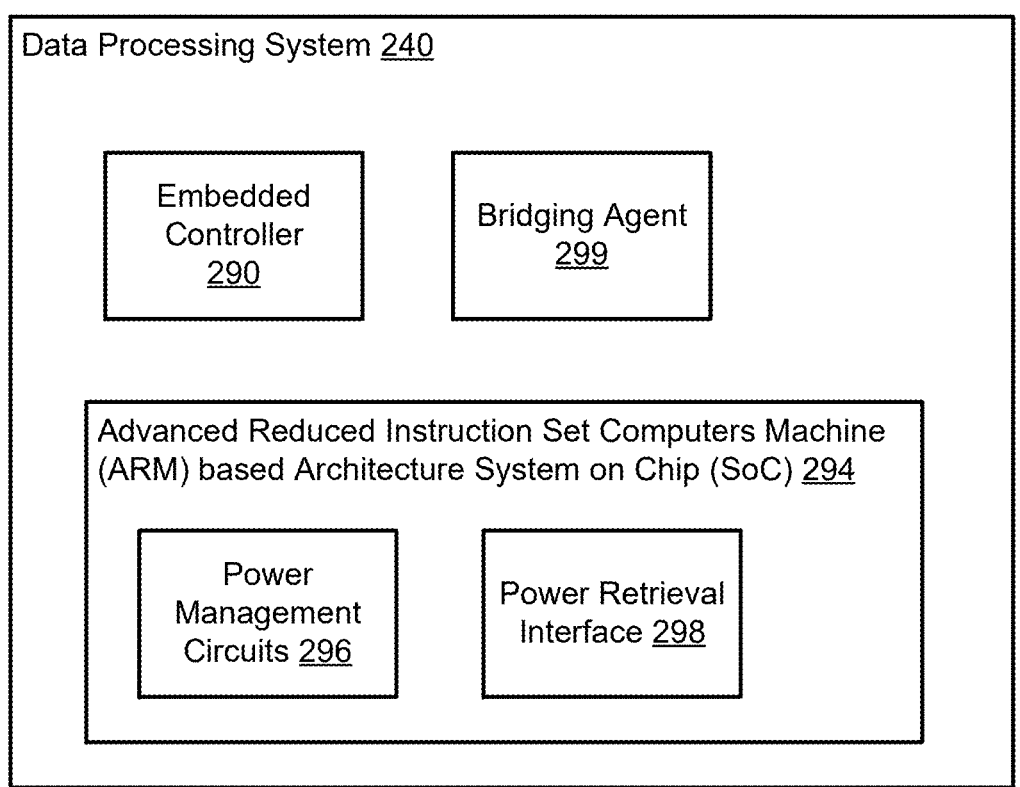
FIG. 2B shows a block diagram illustrating another example of a data processing system in accordance with an embodiment.

Turning now to FIG. 2B, FIG. 2B shows another example of the data processing system 240 shown in FIG. 2A. In particular, FIG. 2B shows an abridged (e.g., simplified) version of the data processing system 240 with certain components visually removed for simplicity. Said another way, although not shown in FIG. 2B, the data processing system 240 of FIG. 2B still includes all of the components shown in FIG. 2A.

As shown in FIG. 2B, data processing system 240 includes an embedded controller 290, an ARM based architecture SoC 294, and a bridging agent 299. Each of these components will be described below.

In embodiments, the embedded controller 290 may be implemented as the management controller 252 discussed above in reference to FIG. 2A. The embedded controller may be directly and/or indirectly connected to (e.g., via one or more side band channels discussed above in FIG. 2A) one or more thermal sensors (not shown) installed within the data processing system 240.

In embodiments, the ARM based architecture SoC 294 may be any type of SoC designed for and installed in SoC devices such as, but not limited to, smartphones, tablets, or the like that utilize an ARM based architecture where the main source of cooling for the devices is passive cooling through throttling of the main processor of the SoC.

In embodiments, the ARM based architecture SoC 294 may have multiple power management circuits 296. Each of these power management circuits 296 may be a power management integrated circuit (PMIC) originally configured to retrieve thermal measurements (e.g., temperature data) from the various thermal sensors installed within the data processing system 240.

In embodiments, as part of using the embedded controller 290 as the single interface for thermal readings, all connections from the thermal sensors that were originally designed to be connected to the PMICs of the ARM based architecture SoC 294 are now re-routed (e.g., re-wired, re-soldered, or the like) to the embedded controller 290. Said another way, the PMICs of the ARM based architecture SoC 294 are no longer going to receive any thermal data (e.g., temperature data) from any of the thermal sensors. Instead, all thermal data will be provided (e.g., directly or indirectly) from the thermal sensors to the embedded controller 290.

In embodiments, the ARM based architecture SoC 294 may also have a power retrieval interface 298. The power retrieval interface 298 may be a system power management interface (SPMI) originally designed to retrieve (e.g., using SPMI hardware (HW) calls originating from firmware stacks at the processor level) the thermal data of the data processing system 240 from the thermal sensors through the power management circuits 296 (e.g., the PMICs) of the ARM based architecture SoC 294.

In embodiments, the bridging agent 299 may be implemented in hardware, software, or a combination or both thereof. The bridging agent 299 may be configured as a bridge connecting the embedded controller 290 to the ARM based architecture SoC 294 that allows the embedded controller 290 to be able to communicate with the ARM based architecture SoC 294. Without the bridging agent 299, there are no mechanisms within the embedded controller 290 or the ARM based architecture SoC 294 that would allow these two components to communicate (e.g., exchange data) between one another. Said another way, without the bridging agent 299, there would be no mechanisms available for the ARM based architecture SoC 294 to retrieve the thermal data (of the data processing system 240) obtained by the embedded controller 290.

Additional details of how the bridging agent 299 facilitates communication between the embedded controller 290 and the ARM based architecture SoC 294 is discussed below in reference to FIG. 3.

Figure 3:
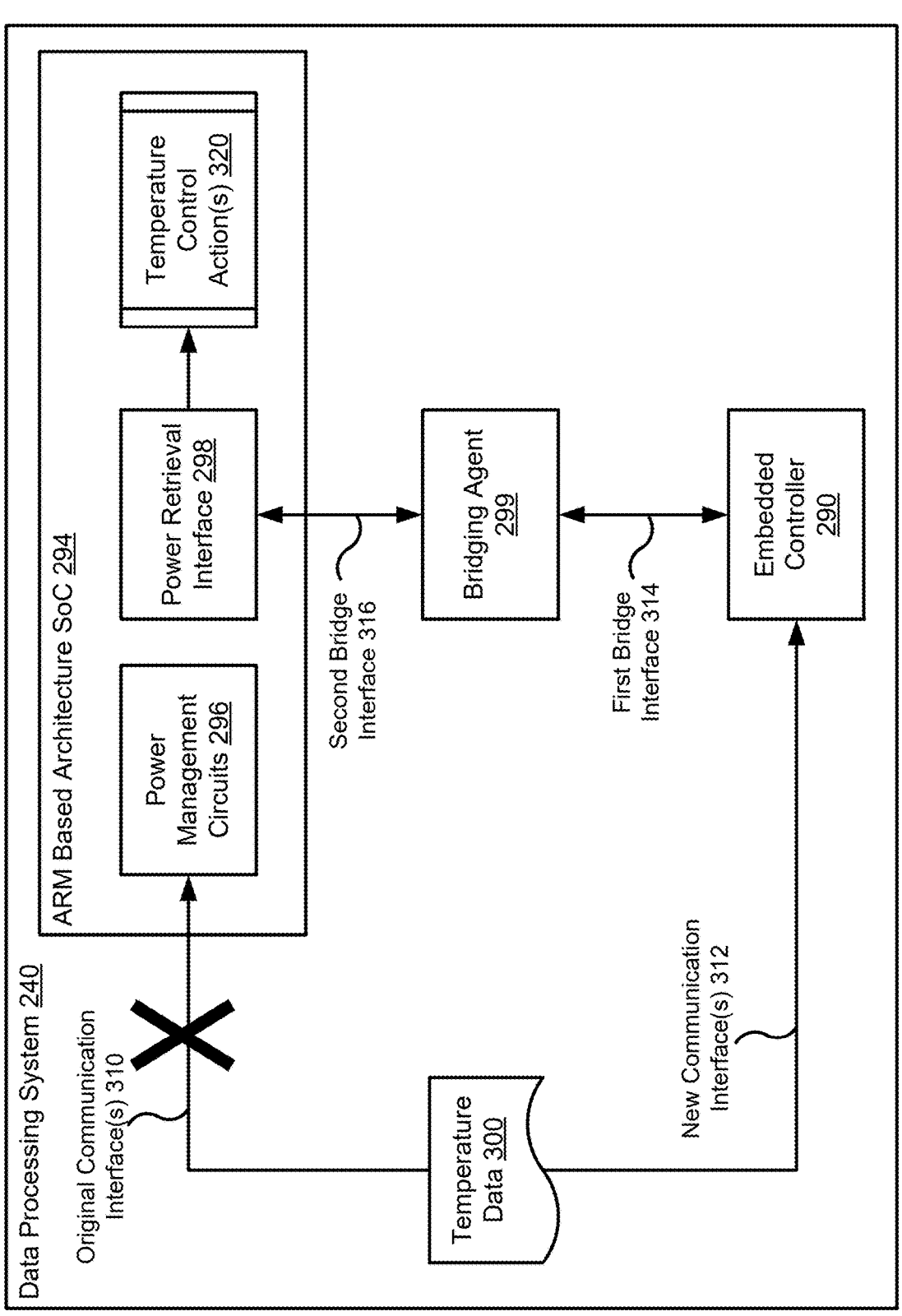
FIG. 3 shows a data flow diagram in accordance with one or more embodiments.

Turning now to FIG. 3, to further clarify embodiments disclosed herein, a data flow diagram in accordance with one or more embodiments disclosed herein is shown in FIG. 3. In these diagrams, flows of data and processing of data are illustrated using different sets of shapes. A first set of shapes (e.g., 300, etc.) is used to represent data structures (e.g., files, data packets, or the like), a second set of shapes (e.g., 320, etc.) is used to represent processes performed using and/or that generate data, and a third set of shapes (e.g., 290, 296, 298, 299, etc.) is used to represent the components (e.g., the devices, hardware and/or software components, or the like discussed above in reference to FIGS. 1-2B) that perform the processes shown using the second set of shapes.

As shown in FIG. 3, temperature data 300 may be obtained (e.g., by one or more thermal sensors installed within data processing system 240). In embodiments, the temperature data 300 may include temperature values indicative of: (i) the overall temperature within a housing (e.g., chassis, case, etc.) of the data processing system 240; (ii) temperatures of certain areas/portions within the housing; (iii) temperatures of individual (or a group of) components (e.g., of the ARM based architecture SoC 294, of the power supply, or the like); or the like.

Any temperature value measured within the data processing system may be included in the temperature data 300 without departing from the scope of embodiments disclosed herein.

As further shown in FIG. 3, this temperature data 300 is originally configured (e.g., within an ARM based architecture device/system) to be provided to power management circuits 296 of ARM based architecture SoC 294 over original communication interface(s) 310. However, in embodiments, these original communication interface(s) 310 have been removed (e.g., as shown with the "X" juxtaposed over the communication line depicting original communication interface(s) 310) and no longer exist. Said another way, in embodiments, power management circuits 296 of ARM based architecture SoC 294 is no longer able to receive any temperature data 300.

Rather, temperature data 300 is now provided (e.g., directly or indirectly from the thermal sensors) to the embedded controller 290 via new communication interface (s) 312. These new communication interface(s) 312 may be any of the side band channels (e.g., discussed above in reference to FIG. 2A) that connect each of the thermal sensors of the data processing system 240 to the embedded controllers 290. In embodiments, by way of new communication interface(s) 312, the embedded controller 290 now has sole control over the thermal sensors of the data processing system 240. More specifically, sole control over the thermal sensors of the data processing system 240 is now transferred from the ARM based architecture SoC 294 to the embedded controller 290.

Once received by the embedded controller 290, the temperature data 300 may be provided by the embedded controller 290 to bridging agent 299 over a first bridge interface 314 of the bridging agent 299 that directly connects these two components to one another. In embodiments, the first bridge interface 314 of the bridging agent 299 translates temperature data 300 between a native format used by the embedded controller 290 and an enhanced serial peripheral interface (eSPI) format. Said another way, the temperature data 300 is provided by the embedded controller 290 to the bridging agent 299 in the eSPI format (e.g., using eSPI communication interface-based techniques).

In embodiments, either of the embedded controller 290 or the bridging agent 299 may perform the translation of the temperature data 300 between the native format used by the embedded controller 290 and the eSPI format.

Once received by the bridging agent 299 over the eSPI format, the temperature data 300 is then forwarded by the bridging agent to the power retrieval interface 298 (e.g., the SPMI interface) of the ARM based architecture SoC 294 over a second bridge interface 316 that directly connects the bridging agent 299 to the power retrieval interface 298 of the ARM based architecture SoC 294.

In embodiments, the second bridge interface 316 of the bridging agent translates the temperature data 300 between the eSPI format to an SPMI format used by the SPMI interface. Said another way, the temperature data 300 is provided by the bridging agent 299 to the ARM based architecture SoC 294 in the SPMI format.

Once received by the power retrieval interface 298, the temperature data may be used by the ARM based architecture SoC 294 to implement (e.g., start, instantiate, or the like) one or more temperature control actions 320. For example, based on the temperature values included in the temperature data 300, the ARM based architecture SoC 294 may adjust a level of throttling of the main processor to manage a cooling of the data processing system. For example, if the ARM based architecture SoC 294 determines that the temperature values have increased, the throttling may be increased, and vice versa.

The above example describes a scenario where the embedded controller 290 transmits the temperature data 300 to the ARM based architecture SoC 294 without receiving instructions from the ARM based architecture SoC 294 for the temperature data 300 (e.g., during a regular reporting of the temperature data 300 or the like).

In embodiments, the ARM based architecture SoC 294 may also initiate requests to retrieve (e.g., attempt to retrieve) the temperature data 300 (e.g., when the higher level stacks implemented/running within the ARM based architecture SoC 294 issues an SPMI HW access call (also referred to herein as a "temperature fetching call") to pull thermal data from one or more of the thermal sensors of the data processing system 240). In embodiments, such SPMI HW access calls may originate at the power retrieval interface 298 and (in a typical ARM based architecture) is originally intended to be transmitted by the power retrieval interface 298 to the power management circuits 296.

However, because the power management circuits 296 in embodiments disclosed herein are no longer able to obtain the temperature data 300, the SPMI HW access call from the power retrieval interface 298 is instead re-routed (e.g., by the ARM based architecture SoC 294 and/or the bridging agent 299) over the bridging agent 299 to the embedded controller 290. The SPMI HW may be, as part of the re-routing by the bridging agent 299 to the embedded controller 290, translated to an eSPI format temperature data fetching call. Once the embedded controller 290 receives the SPMI HW access call (e.g., the temperature data request in the form of the eSPI format temperature data fetching call) from the ARM based architecture SoC 294, the embedded controller 290 may obtain the temperature data 300 from the thermal sensor(s) indicated within the SPMI HW access call and provide the obtained temperature data 300 to the ARM based architecture SoC 294 through the bridging agent 299.

In embodiments, even though the SPMI HW access call is re-routed over the bridging agent 299, it would still advantageously appear to the ARM based architecture SoC 294 (namely, to the higher level stacks running in the ARM based architecture SoC 294) that the power retrieval interface 298 is (and/or the higher level stacks themselves are)

connected to the power management circuits 296 while in fact the power retrieval interface 298 are actually connected to the embedded controller 290.

Such a configuration where the embedded controller 290 now has complete control over the thermal sensors also provides additional advantages. In particular, because the embedded controller 290 is able to operate independently from the ARM based architecture SoC 294, assume that the data processing system 240 now has a housing big enough to include one or more motorized fans for providing active cooling techniques. In such a configuration, the embedded controller 290 will be able to implement such active cooling techniques using the fans even when the ARM based architecture SoC 294 is not running or not yet fully operational (e.g., during a pre-boot stage of the data processing system 240 when the OS hosted on the ARM based architecture SoC 294 is not yet operational to provide throttling using OS-based drivers.

Additionally, the embedded controller 290 may now manage the thermals (e.g., system temperature control) of the data processing system 240 without being instructed by the ARM based architecture SoC 294 (e.g., when the higher level stacks are not running on the ARM based architecture SoC 294). Thus, when the embedded controller 290 detects that the data processing system 240 (or a particular component installed therein) is overheating, the embedded controller 290 can report such findings to the ARM based architecture SoC 294 (e.g., through bridging agent) to cause the ARM based architecture SoC 294 to provide the throttling to cool down the system. This would not be possible in the original ARM based architecture where multiple PMICs were used to obtain the temperature data 300. In particular, each PMIC would only have a limited view of the temperatures within the data processing system 240 and would not be able to act independently from the ARM based architecture SoC 294 (i.e., would not be able to independently determine that the data processing system 240 is overheating).

Any of the processes illustrated using the second set of shapes (shown in FIG. 3) may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Figure 4:
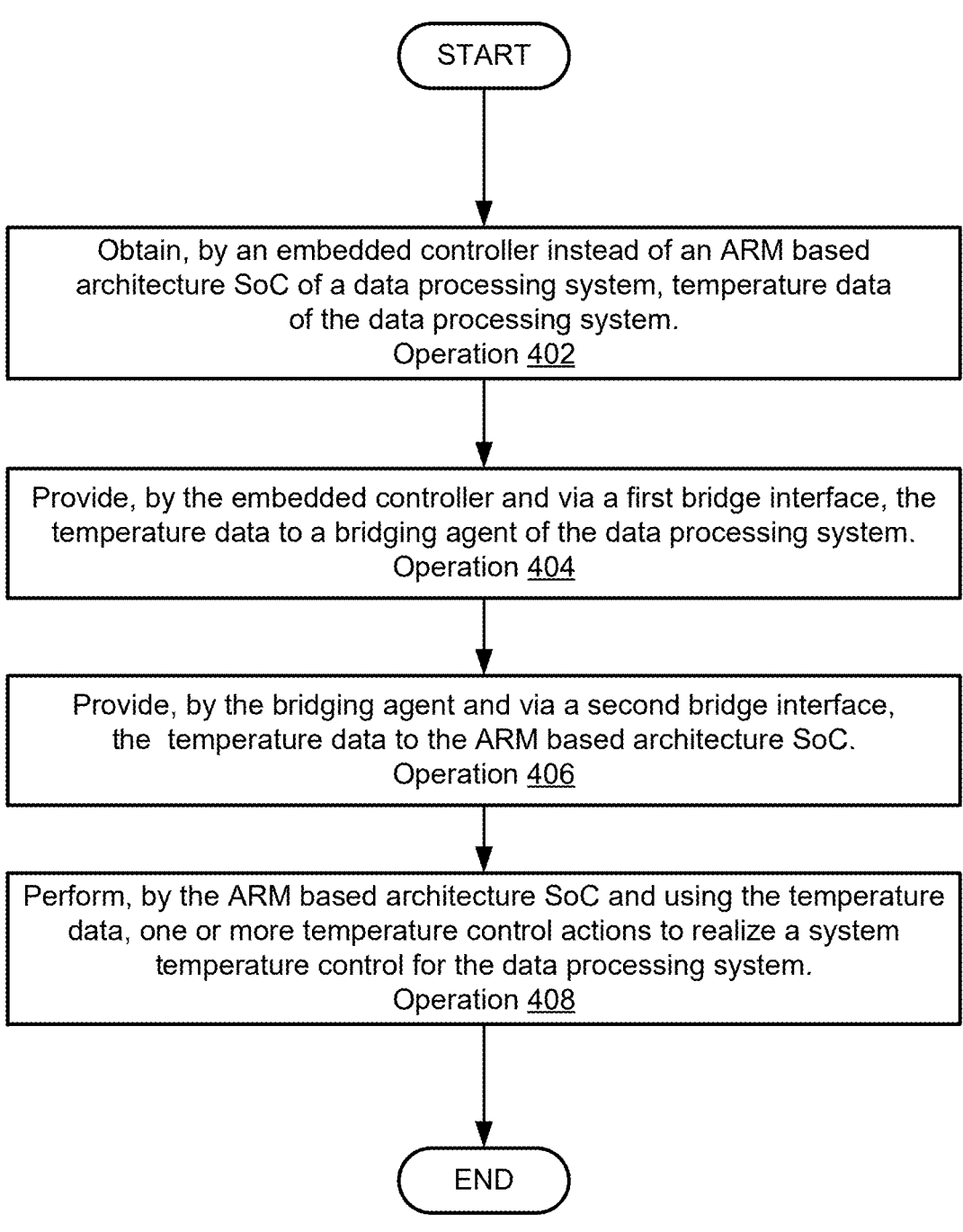
FIG. 4 shows a flowchart in accordance with one or more embodiments.

As discussed above, the components of FIGS. 1-3 may perform various methods for cooling (e.g., providing system temperature control for) a data processing system. FIG. 4 illustrates an example method that may be performed by the components of FIGS. 1-3. For example, any of the data processing system 102, and/or the other devices 103 shown in FIG. 1 may include components (e.g., shown in FIGS. 2A-2B) that are capable of performing all or a portion of the method of FIG. 4. In the diagram discussed below and shown in FIG. 4, any of the operations may be repeated, performed in different orders, and/or performed in parallel with or in a partially overlapping in time manner with other operations.

In Operation 402, and as discussed above in reference to FIGS. 2B-3, temperature data may be obtained by an embedded controller of a data processing system instead of by an ARM based architecture SoC also installed in the data processing system.

In embodiments, the temperature data may be collected (e.g., measured) by one or more thermal sensors installed within the data processing system. Control over the one or more thermal sensors may be provided exclusively to the embedded controller (rather than being shared with the ARM based architecture SoC through PMICs of the ARM based architecture SoC). Said another way, the embedded controller is configured to take over control of one or more thermal sensors of the data processing system originally controlled by the ARM based architecture SoC.

In embodiments, the embedded controller obtains the temperature data directly from one or more thermal sensors of the data processing system via side band channels (e.g., inter-integrated circuit (I2C)/improved inter-integrated circuit (I3C) interfaces/channels, ADC channels, or the like) between each of the one or more thermal sensors and the embedded controller.

In Operation 404, and as discussed above in reference to FIGS. 2B-3, the temperature data may be provided by the embedded controller to a bridging agent over a first bridge interface between the embedded controller and the bridging agent.

In embodiments, the first bridge interface translates the temperature data between a native format used by the embedded controller and an enhanced serial peripheral interface (eSPI) format. In particular, the temperature data is provided by the embedded controller to the bridging agent in the eSPI format.

In Operation 406, and as discussed above in reference to FIGS. 2B-3, the temperature data may be provided by the bridging agent to the ARM based architecture SoC over a second bridge interface between the bridging agent and the ARM based architecture SoC.

In embodiments, the second bridge interface translates the temperature data between the eSPI format to a system power management interface (SPMI) format. In particular, the temperature data is provided by the bridging agent to the ARM based architecture SoC (namely, an SPMI interface of the ARM based architecture SoC) in the SPMI format.

In embodiments, the embedded controller is unable to provide the temperature data directly to the ARM based architecture SoC without the bridging agent.

In Operation 408, and as discussed above in reference to FIGS. 2B-3, the ARM based architecture SoC may perform one or more temperature control actions (e.g., using the temperature data received from the embedded controller through the bridging agent) to realize a system temperature control for the data processing system.

In embodiments, the one or more temperature control actions may involve lowering or increasing a temperature within the data processing system through adjusting a throttling level of a main processor of the ARM based architecture SoC.

The method may end following operation 408.

Figure 5:
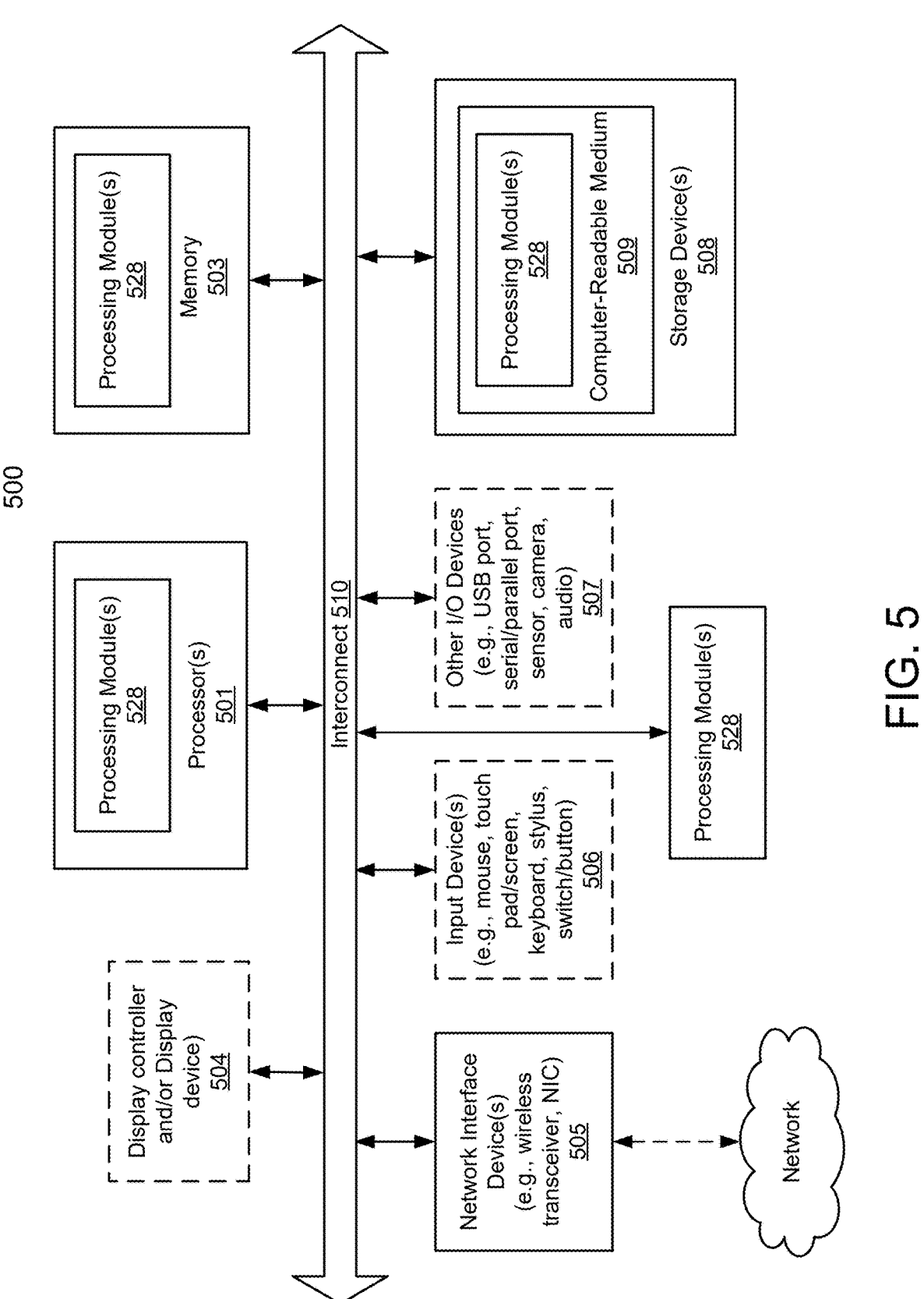
FIG. 5 shows a block diagram illustrating a data processing system in accordance with one or more embodiments.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations.

System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like.

More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device.

For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs, or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for providing system temperature control using an embedded controller installed in a data processing system having an advanced reduced instruction set computer machines (ARM) based architecture system on a chip (SoC), the method comprising:

obtaining, by the embedded controller of the data processing system instead of the ARM based architecture SoC, temperature data of the data processing system, wherein one or more thermal sensors of the data processing system directly transmit the temperature data to the embedded controller instead of to power management circuits of the ARM based architecture SoC, and the power management circuits of the ARM based architecture SoC is no longer able to receive the temperature data directly from the one or more thermal sensors;

providing, by the embedded controller and via a first bridge interface, the temperature data to a bridging agent of the data processing system;

providing, by the bridging agent and via a second bridge interface, the temperature data to the ARM based architecture SoC; and performing, by the ARM based architecture SoC and using the temperature data, one or more temperature control actions to realize the system temperature control for the data processing system.

2. The method of claim 1, wherein the embedded controller receives the temperature data directly from the one or more thermal sensors via an inter-integrated circuit (I2C) or an improved inter-integrated circuit (I3C) interface between each of the one or more thermal sensors and the embedded controller.

3. The method of claim 2, wherein the bridging agent comprises the first bridge interface and the second bridge interface, and the first bridge interface translates the temperature data between a native format used by the embedded controller and an enhanced serial peripheral interface (eSPI) format, the temperature data being provided by the embedded controller to the bridging agent in the eSPI format.

4. The method of claim 3, wherein the second bridge interface translates the temperature data between the eSPI format to a system power management interface (SPMI) format, the temperature data being provided by the bridging agent to the ARM based architecture SoC in the SPMI format.

5. The method of claim 4, wherein the embedded controller is unable to provide the temperature data directly to the ARM based architecture SoC without the bridging agent, and the ARM based architecture SoC comprises an SPMI interface that receive the temperature data from the bridging agent in the SPMI format.

6. The method of claim 1, wherein the ARM based architecture SoC is directly adapted from a device that is designed to implement the system temperature control without the embedded controller and with only the ARM based architecture SoC.

7. The method of claim 2, wherein the embedded controller is configured to take over control of the one or more thermal sensors originally controlled by the ARM based architecture SoC, the one or more thermal sensors are configured to collect the temperature data.

8. The method of claim 1, further comprising:

determining that the ARM based architecture SoC is attempting to retrieve the temperature data using a temperature fetching call, the temperature fetching call being intended for the one or more thermal sensors;

re-routing, instead of sending the temperature fetching call directly from the ARM based architecture SoC to the one or more thermal sensors, the temperature fetching call from the ARM based architecture SoC to the embedded controller, the temperature fetching call being re-routed via the bridging agent; and providing, by the embedded controller and using the bridging agent, the temperature data to the ARM based architecture SoC to complete the temperature fetching call.

9. The method of claim 8, wherein the temperature fetching call is an SPMI hardware access call made by the ARM based architecture SoC to pull the temperature data from the one or more thermal sensors, and re-routing the temperature fetching call comprises formatting, by the bridging agent, the SPMI hardware access call into an eSPI format temperature data fetching call to be transmitted to the embedded controller over the first bridge interface.

10. A non-transitory machine-readable medium having instructions stored therein, which when executed by a processor, cause the processor to perform operations for providing system temperature control using an embedded controller installed in a data processing system having an advanced reduced instruction set computer machines (ARM) based architecture system on a chip (SoC), the processor being part of the ARM based architecture SoC and the operations comprising:

obtaining, by the embedded controller of the data processing system instead of the ARM based architecture SoC, temperature data of the data processing system, wherein one or more thermal sensors of the data processing system directly transmit the temperature data to the embedded controller instead of to power management circuits of the ARM based architecture SoC, and the power management circuits of the ARM based architecture SoC is no longer able to receive the temperature data directly from the one or more thermal sensors;

providing, by the embedded controller and via a first bridge interface, the temperature data to a bridging agent of the data processing system;

providing, by the bridging agent and via a second bridge interface, the temperature data to the ARM based architecture SoC; and performing, by the ARM based architecture SoC and using the temperature data, one or more temperature control actions to realize the system temperature control for the data processing system.

11. The non-transitory machine-readable medium of claim 10, wherein the embedded controller receives the temperature data directly from the one or more thermal sensors via an inter-integrated circuit (I2C) or an improved inter-integrated circuit (I3C) interface between each of the one or more thermal sensors and the embedded controller.

12. The non-transitory machine-readable medium of claim 11, wherein the first bridge interface translates the temperature data between a native format used by the embedded controller and an enhanced serial peripheral interface (eSPI) format, the temperature data being provided by the embedded controller to the bridging agent in the eSPI format.

13. The non-transitory machine-readable medium of claim 12, wherein the second bridge interface translates the temperature data between the eSPI format to a system power management interface (SPMI) format, the temperature data being provided by the bridging agent to the ARM based architecture SoC in the SPMI format.

14. A data processing system comprising:

an advanced reduced instruction set computer machines (ARM) based architecture system on a chip (SoC) having a processor coupled to a memory;

an embedded controller; and a bridging agent between the embedded controller and the ARM based architecture SoC, wherein the memory stores instructions that, when executed by the data processing system, causes the data processing system to perform operations for providing system temperature control, the operations comprising:

obtaining, by the embedded controller of the data processing system instead of the ARM based architecture SoC, temperature data of the data processing system, wherein one or more thermal sensors of the data processing system directly transmit the temperature data to the embedded controller instead of to power management circuits of the ARM based architecture SoC, and the power management circuits of the ARM based architecture SoC is no longer able to receive the temperature data directly from the one or more thermal sensors;

providing, by the embedded controller and via a first bridge interface, the temperature data to a bridging agent of the data processing system;

providing, by the bridging agent and via a second bridge interface, the temperature data to the ARM based architecture SoC; and performing, by the ARM based architecture SoC and using the temperature data, one or more temperature control actions to realize the system temperature control for the data processing system.

15. The data processing system of claim 14, wherein the embedded controller receives the temperature data directly from the one or more thermal sensors via an inter-integrated circuit (I2C) or an improved inter-integrated circuit (I3C) interface between each of the one or more thermal sensors and the embedded controller.

16. The data processing system of claim 15, wherein the first bridge interface translates the temperature data between a native format used by the embedded controller and an enhanced serial peripheral interface (eSPI) format, the temperature data being provided by the embedded controller to the bridging agent in the eSPI format.

17. The data processing system of claim 16, wherein the second bridge interface translates the temperature data between the eSPI format to a system power management interface (SPMI) format, the temperature data being provided by the bridging agent to the ARM based architecture SoC in the SPMI format.

18. The data processing system of claim 17, wherein the embedded controller is unable to provide the temperature data directly to the ARM based architecture SoC without the bridging agent, and the ARM based architecture SoC comprises an SPMI interface that receive the temperature data from the bridging agent in the SPMI format.

19. The data processing system of claim 14, wherein the ARM based architecture SoC is directly adapted from a device that is designed to implement the system temperature control without the embedded controller and with only the ARM based architecture SoC.

20. The data processing system of claim 14, wherein the embedded controller is configured to take over control of the one or more thermal sensors originally controlled by the ARM based architecture SoC, the one or more thermal sensors are configured to collect the temperature data.

* * * * *